United States Patent
Tulsidas

(10) Patent No.: US 11,486,185 B2
(45) Date of Patent: Nov. 1, 2022

(54) TOUCH-FREE DOOR APPARATUS, SYSTEM AND METHODS THEREOF

(71) Applicant: Luv Tulsidas, New York, NY (US)

(72) Inventor: Luv Tulsidas, New York, NY (US)

( * ) Notice: Subject to any disclaimer, the term of this patent is extended or adjusted under 35 U.S.C. 154(b) by 153 days.

(21) Appl. No.: 16/919,897

(22) Filed: Jul. 2, 2020

(65) Prior Publication Data

US 2021/0317697 A1    Oct. 14, 2021

Related U.S. Application Data

(60) Provisional application No. 63/007,258, filed on Apr. 8, 2020.

(51) Int. Cl.
*E05F 15/00* (2015.01)
*E05F 15/73* (2015.01)
*E05F 15/60* (2015.01)
*G06V 40/16* (2022.01)

(52) U.S. Cl.
CPC .............. *E05F 15/73* (2015.01); *E05F 15/60* (2015.01); *G06V 40/172* (2022.01); *E05F 2015/767* (2015.01); *E05Y 2900/132* (2013.01)

(58) Field of Classification Search
CPC ..... E05F 15/60; E05F 15/73; E05F 2015/767; E05Y 2900/132; G06K 9/00288; G06V 40/172

USPC ............................................................ 49/31
See application file for complete search history.

(56) References Cited

U.S. PATENT DOCUMENTS

| 2015/0218869 A1* | 8/2015 | Yamagiwa | E05B 83/40 49/31 |
| 2019/0216266 A1* | 7/2019 | Ganninger | A47J 43/04 |
| 2019/0226262 A1* | 7/2019 | Tsuboi | E05F 15/73 |
| 2020/0262388 A1* | 8/2020 | Maddelein | E05B 81/78 |
| 2021/0388662 A1* | 12/2021 | Hellwig | G01S 13/04 |

\* cited by examiner

*Primary Examiner* — Chi Q Nguyen
(74) *Attorney, Agent, or Firm* — Mestechkin Law Group P.C.

(57) ABSTRACT

The present application provides a touch-free door driving device initiated upon the affirmative action or command of a user. More specifically, a user a door driving device is provided which can open the door when the user is at a distant location and is approaching the door. This apparatus can be easily installed on either side of the door which is user friendly and easy installation with minimal steps such as anyone can install it at any door of any room. Additionally, in spite of the door thickness, the apparatus can be installed without drilling or using any sort of tool. Preferably, the door driving device is provided with sufficient pull and push torque without any stoppage.

10 Claims, 16 Drawing Sheets

TOUCH-FREE DOOR APPARATUS, SYSTEM AND METHODS THEREOF

CROSS REFERENCES

This application claims priority to U.S. Provisional Patent Application No. 63/007,258, filed on Apr. 8, 2020, entitled "Touch-Free Door Apparatus, System and Methods Thereof," the entire disclosure of which is incorporated herein by reference.

STATEMENT REGARDING FEDERAL SPONSORED RESEARCH OR DEVELOPMENT

This application is not the result of a federally sponsored research or development effort.

Parties Involved in Joint Research Agreements

The applicant is not involved in any joint research agreements or obligations to assign the invention described herein.

TECHNICAL FIELD

The present technology is generally directed to a method and apparatus for automatically opening and closing doors enabling hands free operation, i.e., without the need for users to touch any portion of a door in unrestricted and restricted areas. More specifically, the present technology is directed to an easily installable and self-configurable door driving module configured to operate a door using an early detection and authentication technology to grant access to a user who intends to access entry through the door. Additionally, the present technology can be integrated to paid and authenticated entries.

BACKGROUND

Doorways and door handles are prevalent in every building structure. Door handles, particularly, are considered to be the most contaminated portion of doors as points of entry, particularly with respect to the points of entry in pedestrian high-traffic areas, such as office buildings, public rooms, hotels, hospitals, sporting event venues, and the like. While attempting to gain access to a needed/authorized area through doors in public places, people often make every effort to avoid contact with any surface of a door. Automatic door driving devices hinge-based and electric powered automated swing mechanisms are well-known in the art. Such door systems are generally operated by motion detectors and have bidirectional motors that both open and close the doors as a person approaches the door.

Various door opening mechanisms are known in the prior art. Such devices typically comprise a bracket mechanism extending between a door and a doorway and a means for generating a force against a door by such a bracket mechanism for the purpose of encouraging pivotal rotation of the door. The amount of force required to pivotally open a door is usually an inverse proportion to the leverage that a door opening mechanism will apply. Door opening mechanisms disclosed in prior art are often constructed so that they engage a door at a point fairly close to the hinged connection. Other drawbacks with door opening mechanisms disclosed in prior art also include inability to determine the adequacy of opening of a door, as well as the ability and ease of closing the door after it has been opened. Motorized operators are widely used for controlling the movement of swing doors by remote or automatic control. Nowadays, devices such as reed switches, electric motors, stepper motors, linear motors, pneumatic cylinders, and more are used.

Presently, automatic entrance/exit door control technologies are widely used in unrestricted and restricted places such as shopping malls, grocery stores, businesses, transportation stations, airports, and wholesale department stores to eliminate the need of manually opening and closing actions. Contemporary sensor-based automatic door control technologies include infrared, ultrasonic or radio, or other wireless sensing methods. Although these techniques are all successful in detecting objects, they are not capable of understanding the type and the intention of the objects.

Automatic door opening and closing technologies are being manufactured and sold across the globe. There are special mechanisms designed and configured for hospitals, hotels, medical labs, and clean rooms as it requires quick and autonomous closure for safe operation using a sliding mechanism. For sliding doors there are many technologies that are relatively easy to develop and install for sliding operations. In a typical residential or commercial premise, the majority of doors are swing doors. In case of swing doors there is a need for developing improved systems using the modern state-of-art miniature motors, gears, actuators, sensors, wireless protocols, Magnetic and piezo electric principles.

Door opening and closing is a frequent activity that is being performed daily in residential and commercial premises. Currently a majority of doors are being operated manually, requiring a user to use either one hand or both hands to operate a door. In the majority of cases, if a user carries an item in his hands, manual operation of a door becomes difficult and, sometimes, impossible without the need for a user to free the user's hands to operate a door. Providing automatic door mechanisms especially useful for children and elderly people. Such a system would need to be integrated with digital user interface to eliminate the need for a user to operate a door manually. Automatic door operation mechanisms may also be equipped with an authentication system utilizing, for example, a facial recognition system, which is further connected to an electronic lock for locking and unlocking of the door. Although there are smart door systems with authentication modules, such door systems require expert installation and configuration.

The intelligent door control technologies, compared with traditional ones, not only reduces the false action rate, but offers extra power saving benefits. Moreover, integrating face recognition or similar authentication processes as well as behavior analysis algorithms into the built-in camera and digital signal processors (DSPs) module, it is possible to add disaster or crime prevention functions that thus can be applied to surveillance applications. In another aspect, the present technologies lack push-pull designs in the doors which are easier to use. Also, they lack speedy and accurate access of the doors with authentication technologies. In addition, they also lack automatic wake-up on users approaching the door by using relevant sensors. In addition, the door lock status is not being displayed on the front panel display for the user's convenience. Additionally, multiple modes not being available for quiet entrances late at nights or for other reasons. There is a need for self-installation or do-it-yourself, using a single unit or two units which can be attached to the door is very beneficial.

Hence, to overcome these drawbacks, the present description teaches us a technology for door opening and closing using electromechanical elements that can be powered by wireless or wireless powered system, connected by any wireless protocol. The system is equipped with sensors to detect the collision with any object. Additionally, there is a need for a wireless and wireless-powered or similar technologies enabled wireless access control system to lock or unlock a door at unrestricted and restricted places. The present system is a wireless or wireless powered door opening or closing access system which is a touch free door access technology that can be integrated with a human face recognition and authentication or similar technologies to provide a complete security system having integration software.

SUMMARY OF THE EMBODIMENTS

An embodiment disclosed in this application is directed to a touch-free door driving device configured to operate upon the affirmative action or command of a user.

A preferred embodiment, is directed to a compact door driving device constructed and configured in such manner that enables remote automatic door operations of virtually any door system, e.g. swinging door, "French" door, sliding door or rotating door, while not requiring professional installation on any door irrespective of a thickness of a door and without the need to use any special tools, such as drills. The disclosed door driving device comprises an encasement containing within communicatively connected a power source, a controller 120, a memory, a motor, powertrain having a calibrator, one or more surface-rolling elements, a plurality of sensors, and an image-capturing module.

In another embodiment, the technology provides the door driving device with sufficient pull and push torque without any stoppage. The apparatus is very compact and can be operated with wireless or wireless powered assistance. There is also a provision for charging or swapping the wireless or wireless powered assistance when the wireless or wireless powered indicator shows the charge level as low. In addition, the wireless or wireless powered assistance of the apparatus is provided to cut off over charging and discharging for longer life.

In another embodiment, the present technology provides one or more sensors for locating and monitoring distance of the user approaching and intending to access the door and also for continuously monitoring whether any obstructions are in the door path. The present technology can be configured to control the angle of the door opening or closing at a specific predefined temperature.

In another embodiment, the system is capable of auto calibration of positioning the roller wheels to monitor continuously whether the door is either in the opened or in the closed state based on the requested command of the user. Further, during an event of forced opening or closing of the door by the user, the roller wheels and the gear mechanism are not damaged since the system provides for the roller wheels to be lifted up slightly from the floor to let the door move freely as per the requirement of the user.

In another embodiment, the present technology provides a recalibration for the roller wheels after a predefined time of no movement of the door by the user. The present technology facilitates the roller wheels, to move freely under the non-movement events without lifting and calibrating. Furthermore, the present technology is powered either by wireless charging or using wireless powered technologies for easy operation; it is enabled with a wireless communication such as a Bluetooth, Zigbee or Wi-Fi or similar technologies. The software used enables a wireless connection via radio waves such as Bluetooth or ZigBee or wi-fi or similar technologies between any computer, tablet, mobile, smartphone or similar devices and the door driving device. The present technology ensures the safe opening and closing of doors that must always be opened and closed and monitored or should be closed and monitored in the event of an unfortunate accident.

BRIEF DESCRIPTION OF THE DRAWINGS

For a full understanding of the technology, reference is made to the following detailed description, taken in connection with the accompanying drawings.

DETAILED DESCRIPTION OF EXEMPLARY EMBODIMENTS

Figure 1:
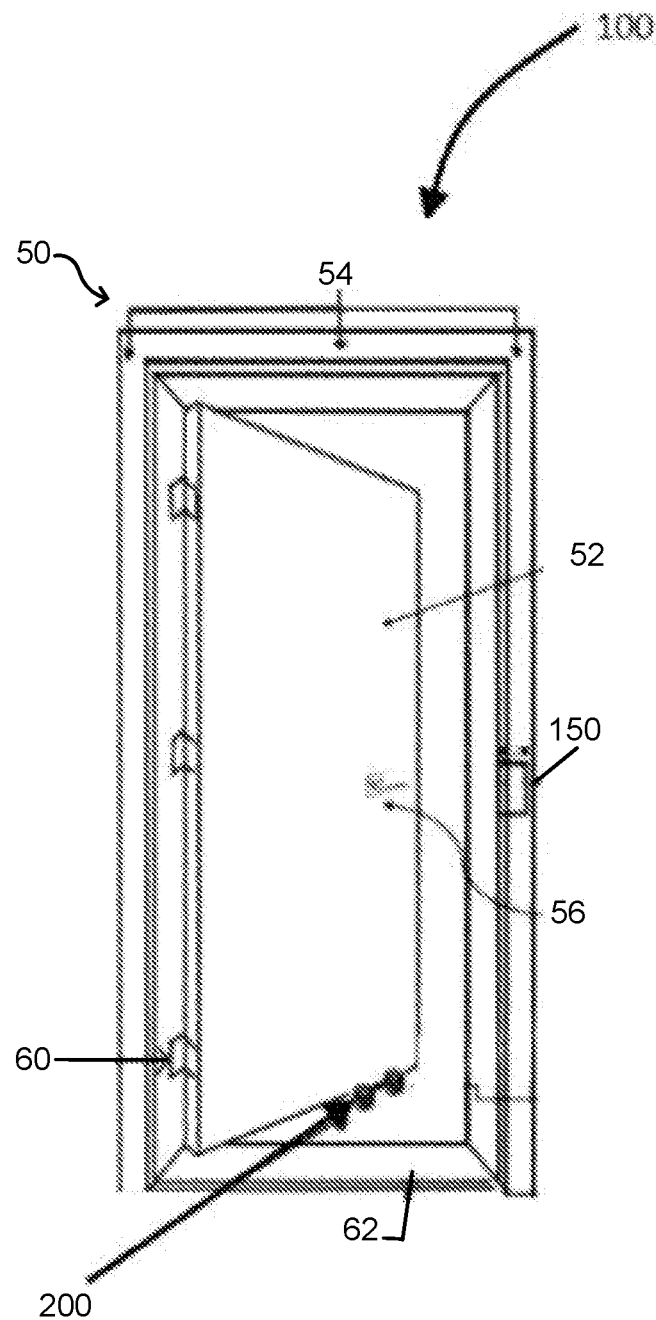
FIG. 1 shows an automatic door opening and closing system according to a first embodiment of the present technology mounted to a door in a door frame.

The present technology is described in one or more embodiments in the following descriptions with reference to the Figures, in which like numerals represent the same. While the technology is described in terms of the best mode for achieving the technology's objectives, it will be appreciated by those skilled in the art that it is intended to cover alternatives, modifications, and equivalents as may be included within the spirit and scope of the technology as defined by the appended claims and their equivalents as supported by the following disclosure and drawings.

Some of the functional units described in this specification have been labelled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of controller 120. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present technology. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, punch card, flash memory, integrated circuits, or other digital processing apparatus memory device.

The schematic flow chart diagrams included are generally set forth as logical flow chart diagrams. As such, the depicted order and labelled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method.

Additionally, the order in which a particular method occurs may or may not strictly adhere to the order of the corresponding steps shown.

Furthermore, the described features, structures, or characteristics of the technology may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the technology. One skilled in the relevant art will recognize, however, that the technology may be practiced without one or more of the specific details, or with other methods, components, materials, and so forth. In other instances, well-known structures, materials, or operations are not shown or described in detail to avoid obscuring aspects of the technology.

Referring now to FIG. 1, an apparatus according to the present technology is illustrated and generally designated by the reference numeral 50. As shown in FIG. 1, a door opening and closing system 50. The system 50 comprises a door 52, provided with a door frame 54, having a doorknob 56 with or without a bolt or lock 56A. An automatic door opening and closing system 100 may be provided at the bottom rear of the door 52. The automatic door opening and closing system 100 includes a system for returning the door 52 to a closed position, a selective control for delaying door 52 closure while a person or object is in the doorway, a sensor housing 64 shown in FIG. 2, having a sensor for detecting the presence of a person or object in or near the doorway. The automatic door opening and closing system 100 also includes a feedback device, e.g., a set of light emitting diodes (LEDs), which provide an indication that the device is operative to hold the door open, and therefore that it need not be manually held for a next person. These Electroluminescent Means 85 may also provide indication of a failure condition, such as low battery, watchdog timer timeout, or mechanical or electronic failure.

Figure 2:
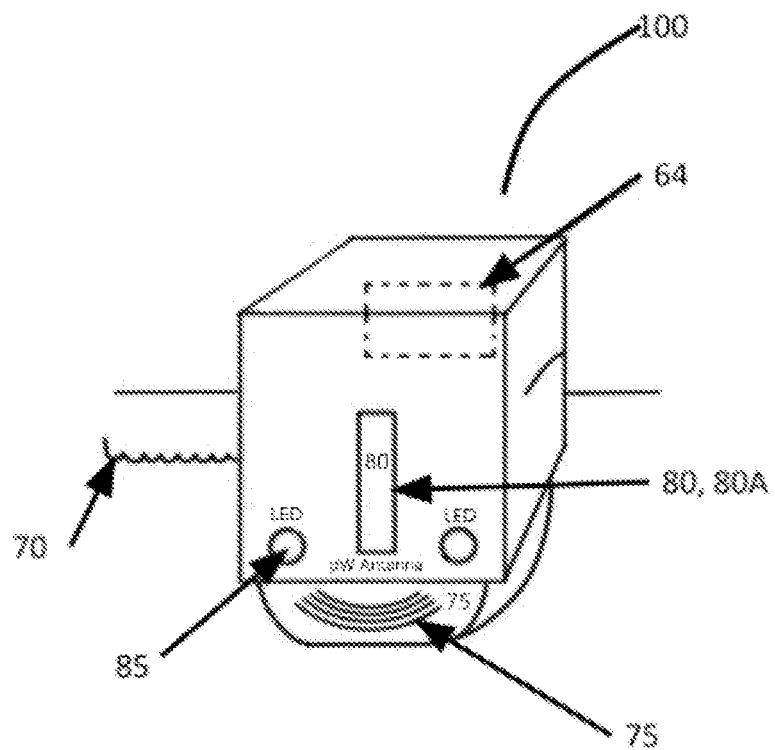
FIG. 2 shows a sensor configuration detail according to the embodiment of FIG. 1.

Referring to FIG. 2 shows in greater detail an embodiment of the sensor housing 64, which in this case is separated from the automatic door opening and closing system 100 but electrically connected by a coiled wire 70. In this embodiment, one or more sensors are provided; a passive infrared (PIR) sensor or similar like sensor 75, and a microwave sensor having a microwave antenna 80. The sensor housing 64 may also include a set of Electroluminescent Means 85, to indicate that the sensor has sensed an object or person, or to otherwise indicate the status of the system. In some cases, the sensor housing is mounted to the door frame 54 and may optionally be wired to receive line power, which may be provided to the automatic door opening and closing system 100 through the coiled wire 70. It is thus clear that a separation from line power is not a negative limitation on all embodiments of the technology, and in fact, where accessible, line power is a quite efficient power source.

However, one of the advantages of the present design is that the operational principles are compatible with non-line powered operation. In this embodiment, the sensor housing 64 is mounted in a predetermined position on the side opposite where the door 52 hinges 60. The sensors 75, are in fixed position, and may be aligned with the normal path of travel through the doorway. The second sensor 75 is sensitive to a change in heat patterns, i.e., infrared wave emissions, through a lens portion, and, for example, includes a sheet of pyroelectric material, such as polyvinylidene fluoride (PVDF). Alternatively, the second sensor system 75 could include an optical sensor, for example an imaging complementary metal-oxide-silicon (CMOS) or charge coupled device (CCD) sensor. In that case, the Electroluminescent Means 85 could advantageously provide illumination. Likewise, the Electroluminescent Means 85 (as laser diodes) could form part of a LIDAR sensor system to detect object range and motion. A microwave sensor 80A emits a signal through microwave antenna 80. This sensor 80A can detect object presence, range, and/or motion, depending on the control system and implementation. Preferably, it is used to detect object presence and as a Doppler sensor to detect velocity with respect to the antenna sensitivity pattern. The sensor system 75 is preferably inactive while the door 52 is closed, conserving power. As the door 52 is opened, which may be detected in any suitable manner, the sensor 75 becomes active, and remains active until the door is closed or is beginning to close. In some cases, the control and infrared sensor 75 may be continually active, since these are relatively low power components. This permits control over operation prior to door opening. For example, the control may lock the door when no person is sensed in the area but when a person is sensed at the doorway, it can be configured to open the door. The control may include an authentication means 150 to authenticate the person to implement controlled access, this authentication means could include optical feature recognition, (radio frequency identification) RFID, security token, fingerprint, iris or other biometric recognition technique, voice recognition, password, (personal identification number) PIN, or other control technique. Additionally, the automatic door opening and closing system 100 may receive an optical, magnetic or radio frequency (RF) signal to receive control instructions from another system, and may provide a platform for the mounting of antennas for wireless networks and the like. The automatic door opening and closing system 100 appropriately determines when the user wants to voice-interact with the automatic door opening and closing system 100 to activate a voice recognizer without using the wake-up word, thereby providing an environment in which the user may more naturally voice-interact with the automatic door opening and closing system 100. The voice recognizer of the device is inactive at ordinary times, but when the user wants to voice-interact with the device, the voice recognizer of the device is automatically activated, thereby saving the power consumption and processing resource and providing the voice recognition service by the device. The voice recognizer is inactive at ordinary times, but only when the user intends voice-interaction with the device, the voice recognizer of the device is automatically activated so that an erroneous operation when the user does not intend the voice-interaction with the device may be prevented. Further, even though a separate wake-up word is not uttered, it is determined when the user wants to interact with the device, so that the user and the device may naturally voice-interact with each other. This determination is performed by the voice recognizer using (artificial intelligence) AI and (Natural Language Processing) NLP.

Figure 3A:
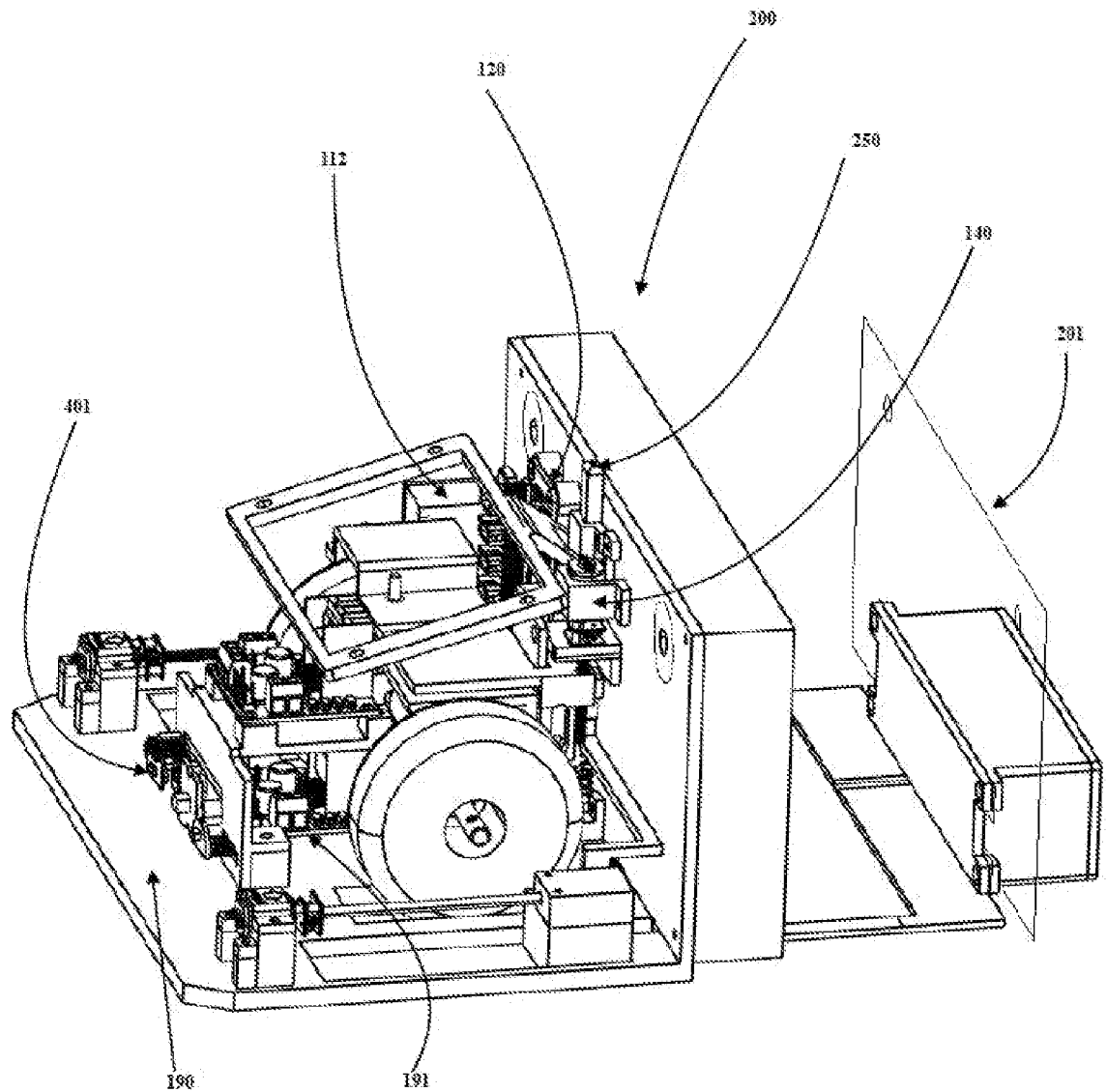
FIG. 3A shows an oblique rear view diagram of a door driving device.

Referring to FIG. 3, shows the door driving device 200. The door driving device 200 comprises a door retaining mechanism 201, a door release mechanism 250, a roller wheel actuator mechanism 140, a drive motor 105 for driving the roller wheels 115, a controller 120, a plurality of first sensors 190, various additional sensing elements (not shown in FIG. 3A), an image-capturing unit 125 and supporting electronics 191.

It should be noted for reference, the sensing elements are used to automatically detect or sense the presence of an object or to monitor and indicate whether the movement limits of that object have been exceeded. In an additional embodiment sensing element 112 may be used to define the limit or endpoint over which an object could travel before being stopped. It was at this point that the sensing element 112 was engaged to control the limit of travel.

The roller wheel actuator mechanism 140 creates motion in a straight line. The actuator 140 may be of various types such as linear actuators or lead screw DC motors, electric motors, stepper motors, linear motors, pneumatic cylinders, and similar devices to generate motion to position the drive motor 105 and roller wheel 115.

Figure 3B:
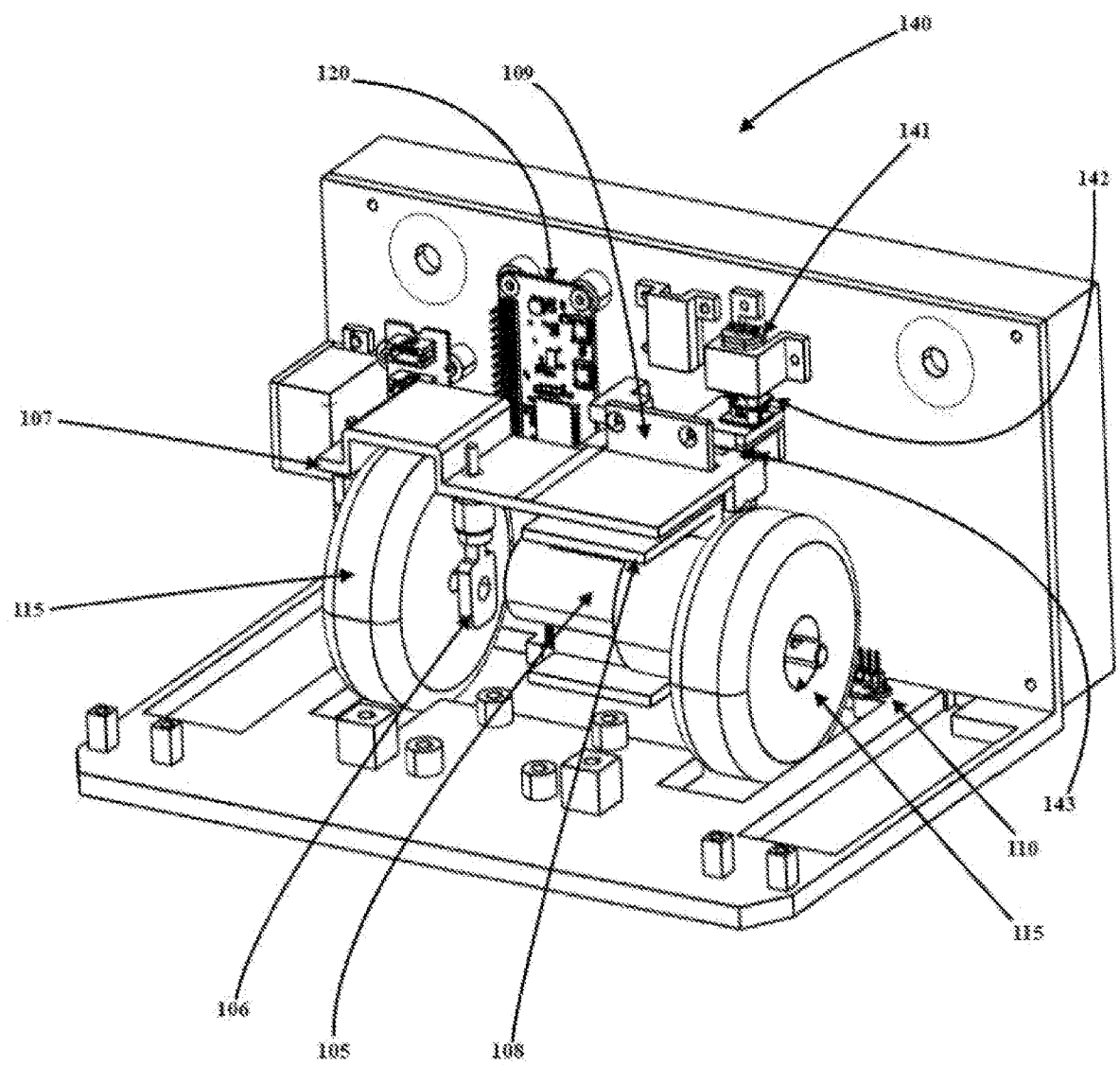
FIG. 3B shows an oblique rear view of a roller wheel actuator mechanism (other parts not shown for clarity)

In one embodiment the roller wheel actuator mechanism 140 is shown in FIG. 3B. This mechanism may comprise a motor 141, a vertical gearbox 142, a leadscrew 143, a slide plate 144, a motor 105, roller wheel 115 (a single roller wheel or more roller wheels may be used), shock absorber 106 (a single shock absorber or more shock absorbers may be used), a motor mount 108 for supporting the drive motor 105 and threadedly connected to the leadscrew 143 and a vertical sensor 110. The roller wheel actuator mechanism 141 may function to move the roller wheel or wheels 115 into contact with the floor. The motor 141 may rotate the leadscrew 143 or may drive the vertical gearbox 142 to rotate the leadscrew 143. Since the leadscrew 143 is threadedly connected to the motor mount 108, the motor mount 108 slides vertically along the slide plate 144. The motor is controlled by the controller 120 to position the roller wheel or wheels 115 using a distance signal from the vertical sensor 110. As the roller wheel or wheels 115 come into contact with the floor, the shock absorber or absorbers 106 absorber some of the energy of the roller wheel actuator mechanism 140. The shock absorber or absorbers 106 are supported by the motor mount 108 by the shock absorber mount 107.

The drive motor 105 is controlled by the controller 120 and may be used to actuate the door 52 directly or may be used as a power assist. When used as a power assist device it simply helps the operator open or close the door 52.

A first sensor 130 monitors the amount of current that goes to the drive motor 105 and this information is received and processed by the controller 120 with memory and is coupled to the circuit. The amount of current going to the drive motor 105 is used to determine the amount of friction experienced by the door 52 in opening and/or closing, as applied by the door driving device 200 and the positioning sensing apparatus to the motor shaft. The circuit and the controller 120 can provide for an adjustment of current. The controller 120 can provide information regarding the door and friction to the user, resource owner, or end-user, or end-user of the door 52

Figure 5:
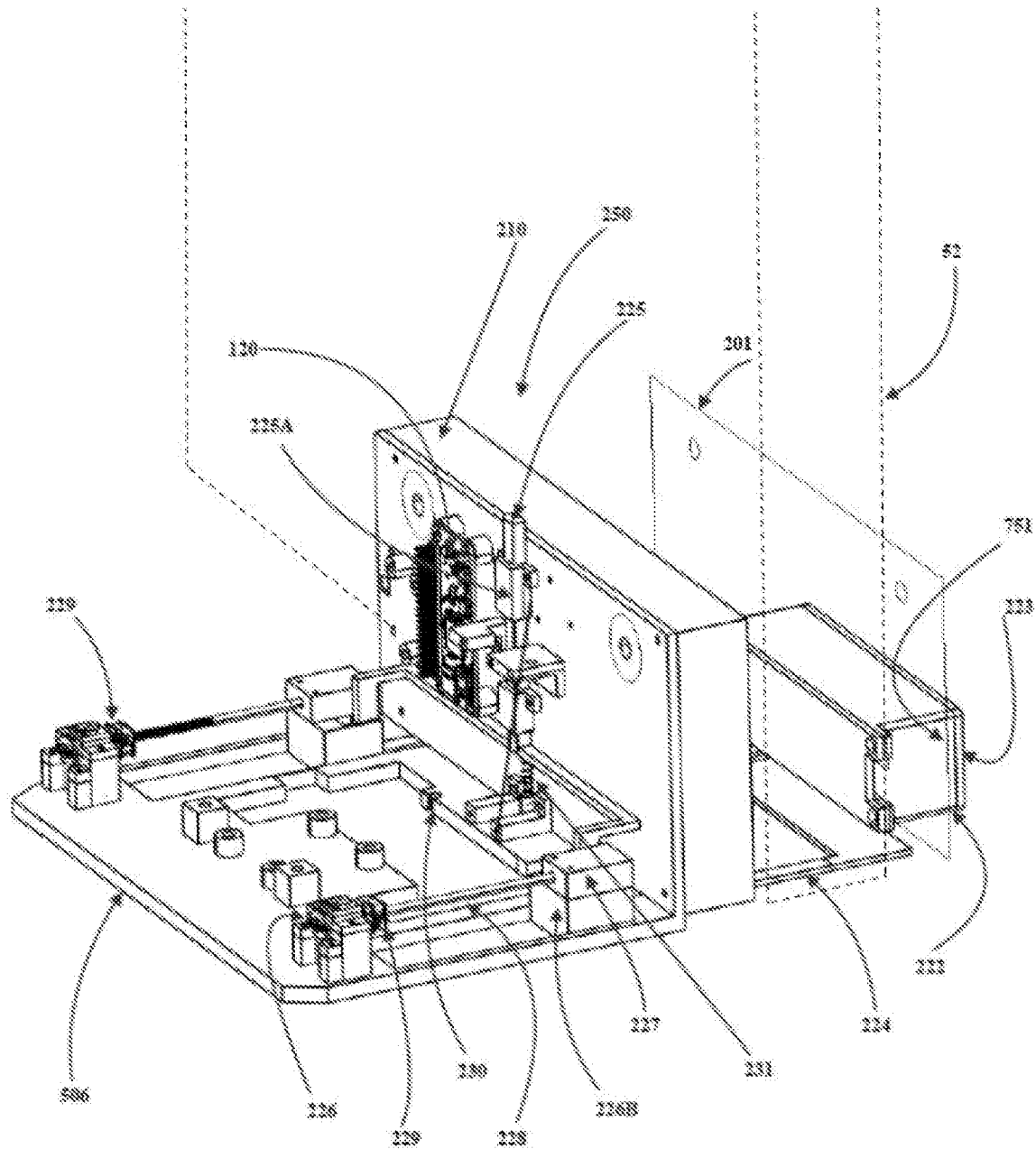
FIG. 5 shows an oblique rear view of a door retaining mechanism (other parts not shown for clarity).

The door retaining mechanism 201 is shown in FIG. 5. The door 52 is clamped by this mechanism between the power supply 210, this power supply can receive power via the line power input 220 or via an on-board battery 751 (see FIG. 7) and the rear sensor assembly 223 which is attached to the distal end of the rails 224. The slider mount 222 is attached to rails 224 which are hooked connected to the moving block 226B. In this embodiment two moving blocks are used, however in other embodiments a single moving block 226B could be used. The details of this hooked connection will be discussed below. In order to move the two moving blocks 226B a leadscrew 228 us threadedly connected to the moving block 226B such that as the leadscrew 228 is rotated about the long axis the moving block 226B moves. To rotate the leadscrew 228 a gearbox 229 and motor 226 are used. Motor 226 is controlled by the controller 120. This causes the slider mount 222 to grip or release the door 52.

A rear sensor assembly 223 is operable to determine when the slider mount 222 is in the gripped position and when the slider mount 222 is not in the gripped position. A magneto-responsive sensor 230 connected to the frame portion 506 and a magnetic element connected to the rear sensor assembly 223. When the slider mount 222 is in the gripped position, the sensor assembly 223 detects the magnetic element. When the sensor assembly 223 determines that the slider mount 222 is not in the gripped position, an indicator is activated to alert the device 100 that the slider mount 222 is not gripping the door 52.

Figure 6:
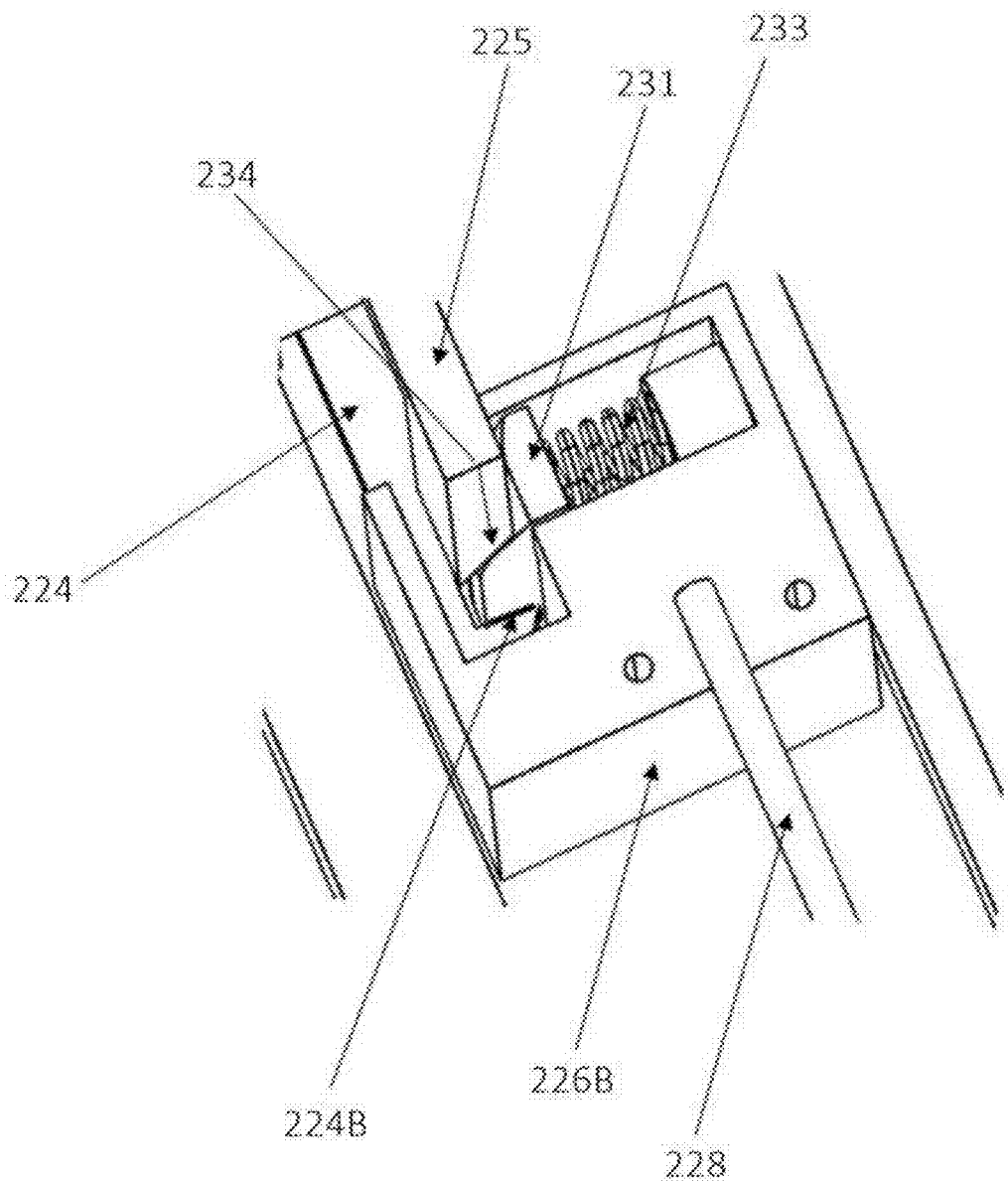
FIG. 6 shows an oblique rear view of a removable door catch (other parts not shown for clarity).

The door release mechanism 250, see explained with reference to FIG. 6, to remove or attach the door driving device 200 to the door 52, the operator requests that the motor 226 be told to move to the completely retracted position shown in FIG. 5. Next the operator pushes a release fork 225 downward in the direction indicated by arrow 234 against the spring 231 (shown in FIG. 5). This causes the pad 231 which is spring loaded against the rails 224 by spring 233, to move away from the rail 224. This movement disengaged the hook surface 224B and allows the operator to remove the door driving device 200 from the door 52.

Figure 13:
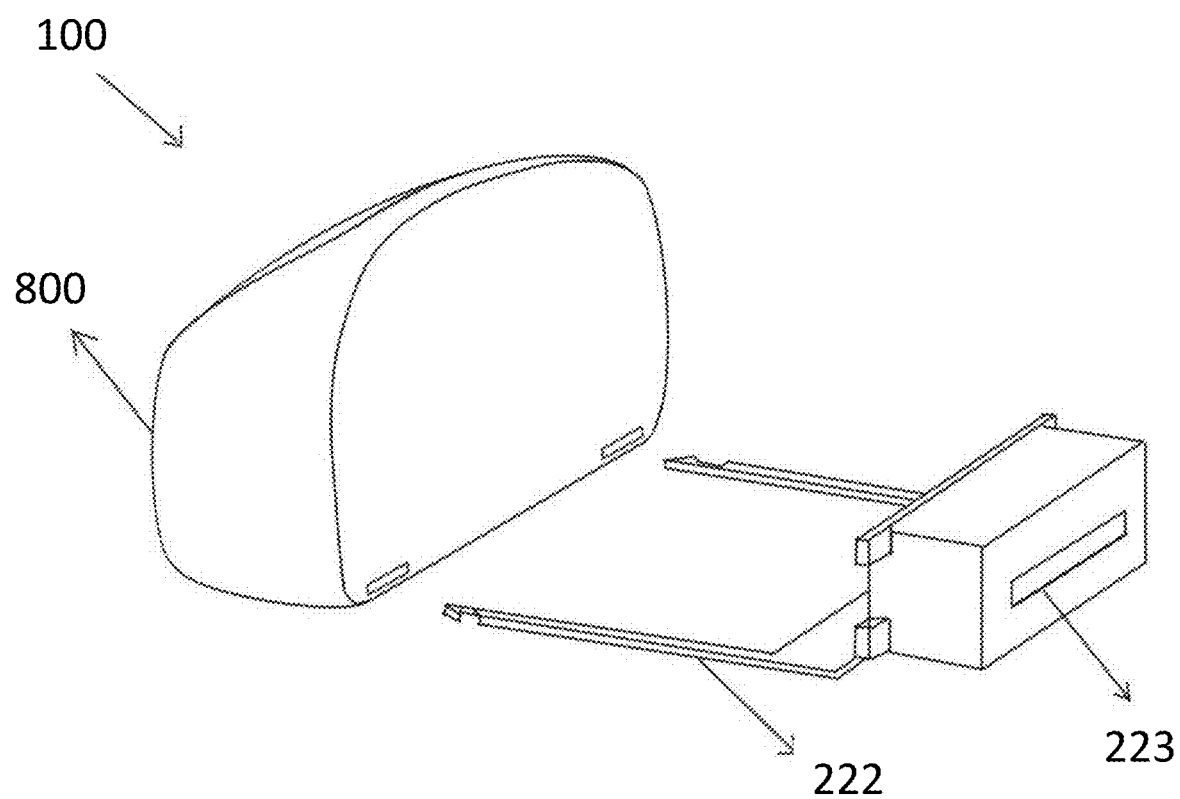
FIG. 13 shows the door driving device and cover with the door retaining device disengaged.
Figure 14:
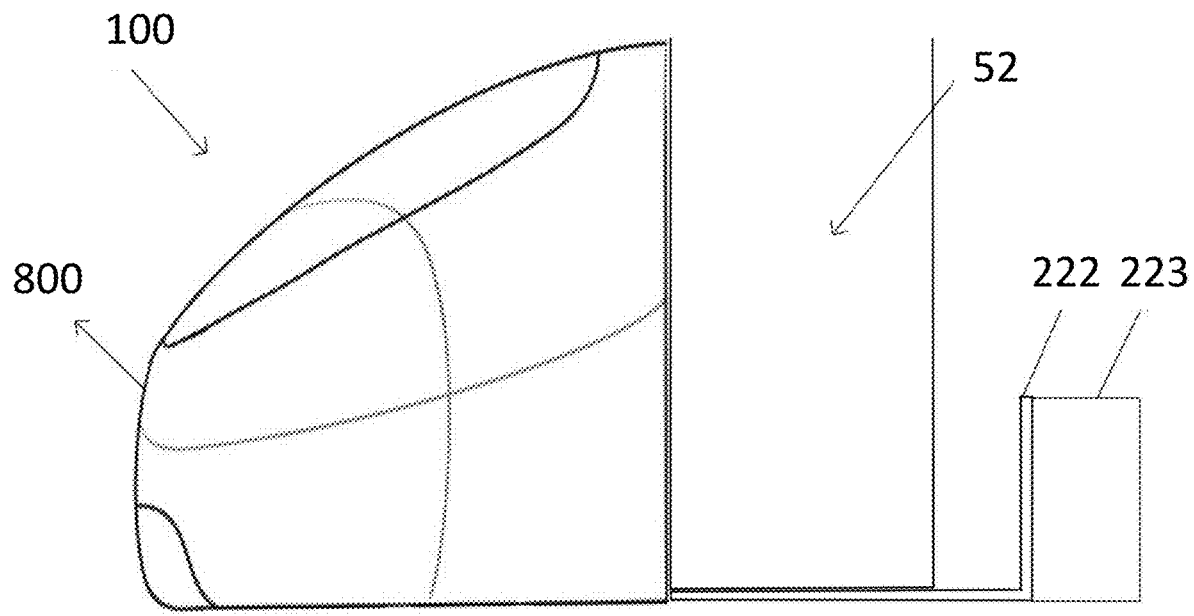
FIG. 14 shows the door driving device and cover with the door retaining device engaged and the roller wheels retracted.
Figure 15:
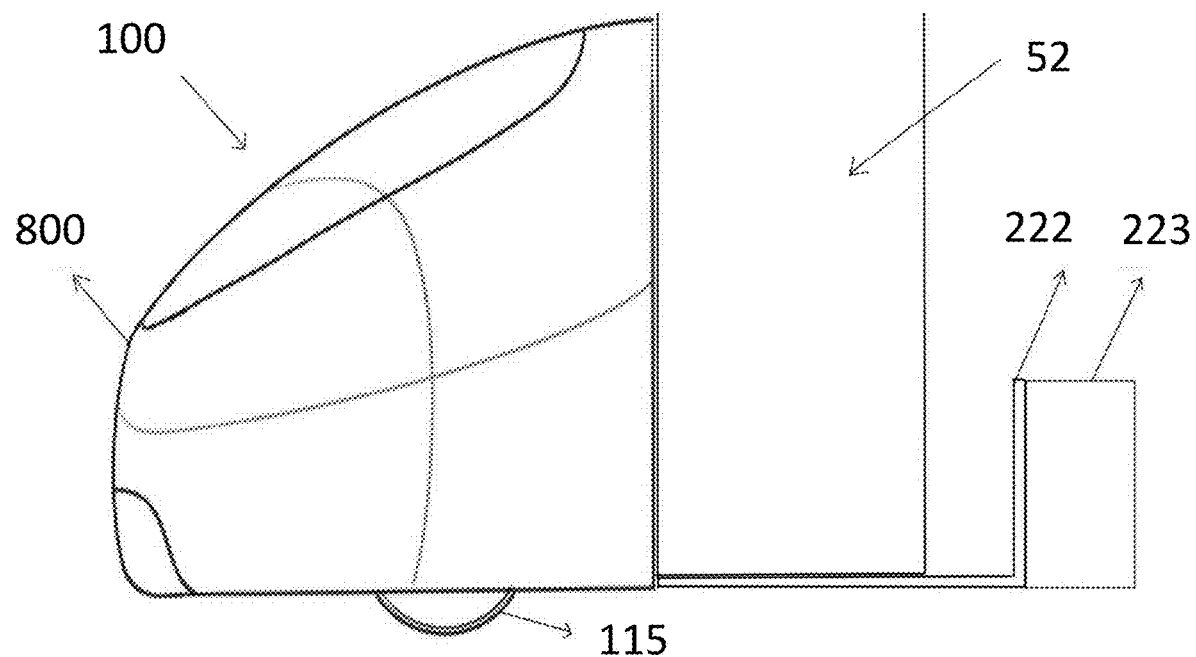
FIG. 15 shows the door driving device and cover with the roller wheels extended.

FIGS. 13, 14 and 15 show a door driving device 200 with a cover 800. The cover 800 enclose a door retaining mechanism 201, a door release mechanism 250, a roller wheel actuator mechanism 140, a drive motor 105 for driving the roller wheels 115, a controller 120, a plurality of first sensors 190, various additional sensing elements (not shown in FIG. 3A), an image-capturing unit 125 and supporting electronics 191.

FIG. 13 shows the door retaining mechanism 201 disengaged from the door release mechanism 250.

FIG. 14 shows the door retaining mechanism 201 engaged from the door release mechanism 250. Additionally, FIG. 14 shows the door 52 prior to being gripped by the door retaining mechanism 250 and the roller wheels 115 of the roller wheel actuator mechanism 140 retracted inside the device.

FIG. 15 shows the door driving device 200 prior to gripping the door 52 with the roller wheels 115 extended toward the floor.

A plurality of first sensors 190 is connected to the wireless or wireless powered assistance power. In one of the embodiments, the automatic door opening and closing system 100 is configured to unlock when a predefined temperature. The user is facilitated with provisions to customize predefined settings of the automatic door opening and closing system 100. In the event a smoke and/or fire is detected by the plurality of first sensors 190 the door 52 automatically unlocks. As non-limiting examples, the automatic door opening and closing system 100 unlocks the bolt or lock when a temperature is sensed by a temperature sensor at a predefined temperature as a safety measure to prevent unfortunate accidents or the like. One of the first sensors 190 sends a signal to the controller 120 which communicates with the bolt or lock 56A to unlock the door 52. It will be appreciated that the controller 120 can be anywhere as long as it is in communication with the first sensor, and bolt or lock 56A, which can be at the door driving device 200, at the back-end, anywhere in the building, and at any remote location. The controller 120 determines if there is an unsafe condition, e.g., based on a rise in temperature and this then results in an unlocking of the bolt or lock 56A.

Electroluminescent Means 85 lighting that can include diffusers, one or more of Electroluminescent patterns pointing upward, inward, and outward and a combination of all three. In one embodiment two control PCDs are provided to compare side by side. It should be noted that the term PCD can be referred to the type of sensor used in our technology to provide a broad and open view of understanding, using the sensors such as PIR or a LIDAR or an ambient temperature sensor. Electroluminescent Means 85 can be independently addressable to provide for maximization of light with the fewest electroluminescence. The Electroluminescent Means 85 are of various types namely light-emitting diodes (LED's) or organic light-emitting diodes (OLED's) or passive-matrix organic light-emitting diodes (PAOLED's) or active-matrix organic light-emitting diodes (AMOLED).

Figure 4:
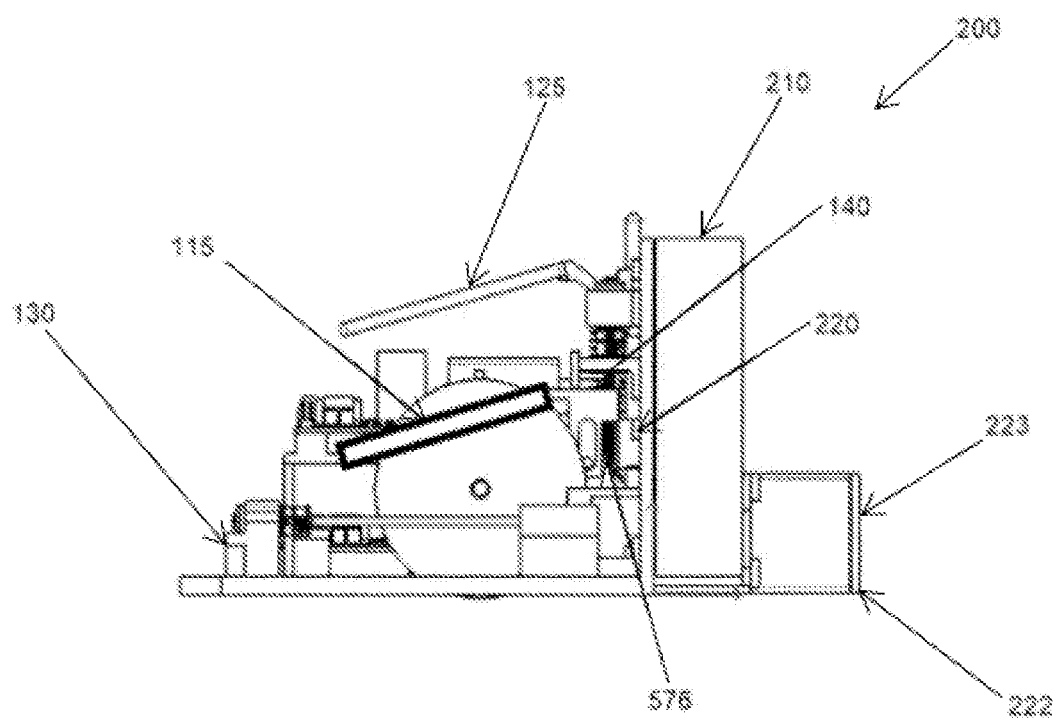
FIG. 4 shows a side view of the door driving device.

FIG. 4 shows one preferred embodiment, the door driving device 200 comprises an image-capturing module 125 having one of more high-definition cameras communicatively connected to the authentication module 150 and configured to capture an image of an area immediately and remotely adjacent to the door 52 and activate the door driving device 200 to open the door 52. The image-capturing module 125 is configured to differentiate between a person carrying an object and a person without an object and allow the door driving device 200 to open the door 52 the appropriate amount so that a person with or without an object can pass through the door frame 54.

The image capturing module 125 is also configured to utilize a face recognition technology and to determine a rate at which an object approaches the door 52 in order to activate the door driving device 200 to open a door at an appropriate rate to accommodate the rate at which an object, once such object is authenticated and authorized to gain access, may proceed through the point of entry where the door 52 is installed.

In one of the embodiments, the door driving device 200 may be equipped with a safety module 401 (see FIG. 3A) comprising laser measuring device 401A and audio transmission device 401B. In case the laser measuring device 401A detects that opening the door 52 for an approaching object may cause contact of a door with a third object, the audio transmission device 401A is activated to warn the approaching object that door 52 may not be opened at the rate to accommodate the approaching object and that the approaching object must reduce the rate at which the approaching object approaches the door 52. The image capturing module 125 is also configured to utilize a face recognition technology to identify an approaching object, in case of a human, or utilize its communicative connection with a database/memory storing information, e.g. serial number, license plate, authentication code of vehicles, delivery drones and other automated delivery vendors. In a preferred embodiment, the image-capturing module 125 is configured to identify more than one approaching object and prevent activation of the door 52 to avoid tail-gating access.

In one embodiment, the drive motor 105 is connected with the controller 120 having a memory, wireless communication device such as a Wi-Fi device including but not limited to a ZigBee device, Bluetooth device with an antenna, radio waves enabled devices or similar devices position sensing devices, speaker (microphone), a sensor may be any of a voltage sensor, temperature sensor or current sensor or power sensor monitors the movement, detects the temperature and power, locates the user and determines the pressure on the drive motor 105 and it's working, a protection circuit to protect the drive motor 105 from overheating, an electroluminescent means that reports status and one or more power supply 210 that power the circuit. The wireless signals enable the controller 120 to unlock, open, close and relock the door 52 by remote control using a small wireless or wireless powered assistance-operated transmitter.

As described previously, the door driving device is protected even if the door is shaken during its opening and shutting. Further, since the roller wheels 115 can be retracted from the floor and the door 52 can be easily switched to a manual operation. In a conventional type of automatic door actuated by friction drive, when it is switched to a manual operation, it is not easy to open or shut the door by hand, because of friction of the drive system.

Figure 12:
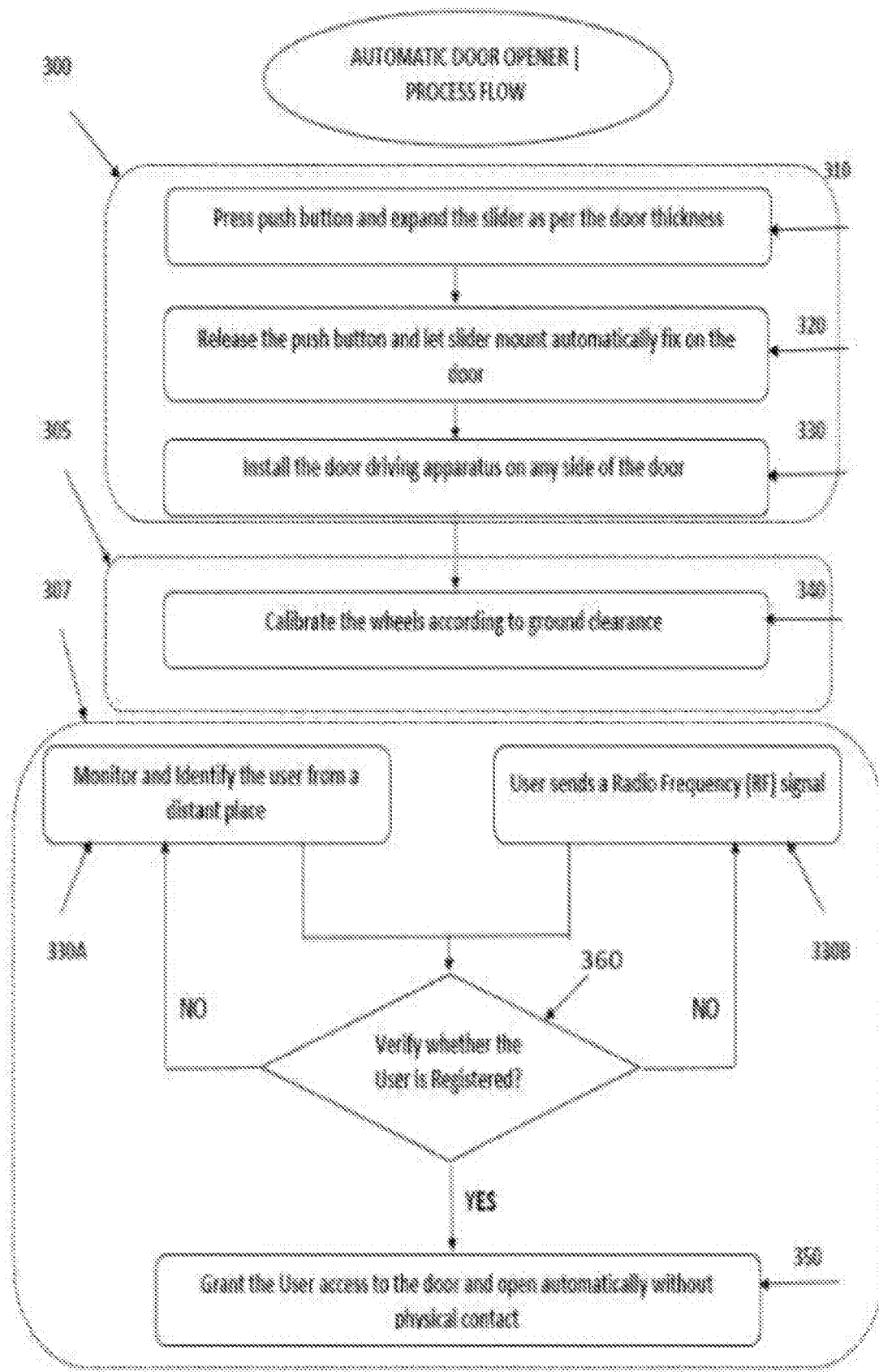
FIG. 12 illustrates a flow chart depicting the steps of the working of the automatic door opening and closing system.

Referring to FIG. 12, is a flow chart depicting the steps of the working of the automatic door opening and closing system 100. Generally, the figures show three phases that are involved for the door driving device 200 to get easily installed, auto calibrated and being operated namely, an installation phase 300, a calibration phase 305 and an operating phase 307.

In one aspect of the present technology, in the installation phase 300, at step 310, a push button is pressed to extend a slider mount 222 according to the thickness of the door 52. At step 320, the push button is released to allow the slider mount to removably attach to the door 222. At step 330, a door driving device 200 is installed on any side of the door 52 i.e., either on the front side or the rear side of the door 52. The user will follow simple and easy steps to install the present technology. The installation procedure involves no mechanical tools or equipment without any drilling on the door 52 or the door frame 54.

In another aspect of the present technology, in the calibration phase 305, at step 340, the roller wheels are calibrated automatically according to the ground clearance and surface to enable the door to be opened or closed automatically. At a first instance, the roller wheels 115 touch the floor and fix the position vertically up and down accordingly. The distance between the door and the floor is identified and set with the measurements as required. At any instance of forceful open or close, the door controller 120 is enabled to detect the incident so that it can pull the roller wheels 115 upward and allow the door to be opened.

Further, the apparatus includes in one embodiment, the position of the roller wheel 115 is located using input from a sensor 110 (see FIG. 3B) that determines the distance of the floor relative to the roller wheels 115 and using the mechanical system adjusts to the position of the roller wheels 115. Additionally, in a similar embodiment, the door driving device 200 could be mounted to the top of the door 52 and the sensor could be used to position the roller wheels 115 to the ceiling. The door 52 is enabled to open and close at a desirable angle which is pre-set and configured as per the user specifications at the time of installation. The sweep length, an angle of rotation, a position of both home and end all are configured and programmed using raspberry Pi-Zero W controller 120 using a programming language.

In another aspect of the present technology, in the operating phase 307, at step 330A, the controller 120 is programmed and enabled to monitor and identify a user being recognized from a far distant zone. Alternatively, at step 330B, any user is also facilitated to send any wireless or wireless powered signal to be recognized and activate the door driving device 200 for opening or closing the door 52. At step 360, the user may be recognized from the authorized server to get authenticated. At step 350, if the user is recognized the door driving device 200 grants access to the authenticated user and opens the door 52 without any physically touch requirements. The apparatus offers the user a touch-free accessibility which involves no sort of physical touch between the device and the user.

Figure 7:
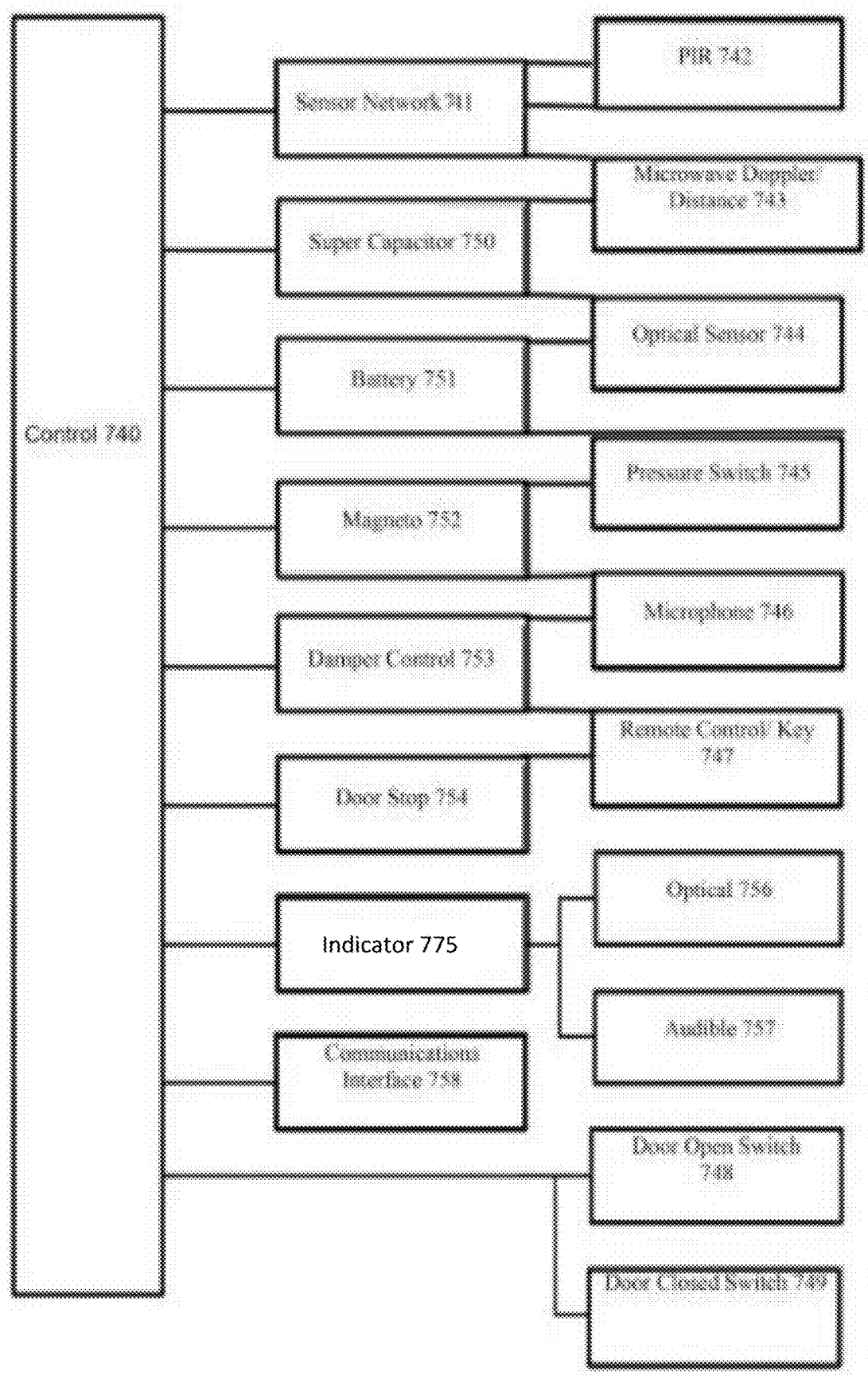
FIG. 7 shows a schematic diagram of a generic control system according to the present technology.

Referring to FIG. 7 shows an embodiment of a control system, i.e., one which includes a number of optional features, not all of which are provided or necessary in all cases. A control 740 implements the logic necessary for intelligent operation, and is, for example, a controller 120. Preferably, the controller 120 includes power driver capabilities, minimizing the requirement for external driver circuitry, but is otherwise of a low power design. It is understood, however, that any sort of logic, including discrete devices, various levels of semiconductor integration, or powerful processors, may be used in the control. Further, while it is preferred that the controller 120 be included within and integral to the door driving device 200, it may be provided separately, for example in a sensor housing or as a part of a centralized control system. The control 740 may therefore optionally have a communications interface 758.

The control 740 generally communicates with a sensor network 741, which, as shown in FIG. 7 may include one or more sensors, for example, a second sensor 742, a microwave/Doppler sensor 743, optical sensor 744 (imaging or non-imaging), a pressure switch 745 (for example, a doormat or surface on the door 52), a microphone 746, or a remote control/key interface 747. The door driving device 200 may also control a lock for the door 52, or be manually operated or overridden through, for example, an infrared or radio frequency interface. It is noted that the remote control/key interface 747 may be consolidated with the communications interface 758.

An indicator system may be provided with audible and/or visible indicators, to indicate the status of the system. For example, low battery failure (mechanical or electronic), object sensed, timeout, and/or door restraint active. The magneto 752 produces a usable current for charging a rechargeable battery pack or the other facilitated energy storage mechanism. The energy storage mechanism also supplies a force which prevents the door from opening rapidly. A door open switch 748 and a door close switch 749 sensor may be provided. The close switch for example, may be used to turn on and off the system, while the door open switch 749 may be used to control a damping factor of the door 52 through a damping control 753.

For example, magneto 752 is rotated during door opening, to supply an electrical charge to super capacitor 750 and/or battery 751. The present technology, accordingly, ensures that the door driving device is automatically placed in battery swap mode before a battery thereof is hot swapped by the user. The device includes a switch located under the battery receptacle cover, which switch is actuated by the removal of the battery receptacle cover in an amount sufficient to expose the switch. Actuation of the switch generates a battery swap mode ("BSM") signal to the device, causing the device to operate in battery swap mode, at which point the battery may be safely removed without risk of losing data stored in the memory. A technical advantage is that it prevents a user from accidentally removing the battery of the device without first placing the device in battery swap mode. A further technical advantage is that it automatically causes the device to enter battery swap mode each time a user attempts to hot swap a battery thereof without any additional action by the user. The control 740 may provide for example controlling an electrical impedance of the magneto to damp door 52 motion. The magneto 752 may also be operated as a motor to return the door 52 to the closed position, for example replacing the traditional spring and damper of prior designs.

It is noted that, in order to provide a fail-safe design, the system preferably does not rely on active devices for door 52 closure. Thus, a mechanical or pneumatic spring cooperates with a damper to ensure that the door closes in a predictable and controlled fashion. A door open switch 748 and door closed switch 749 sensor may be provided. The door closed switch, for example, may be used to turn on and off the system, while the door open switch 749 may be used to control a damping factor of the door 52 through the damping control 753. When a person or object is detected in the doorway by the sensor network 741, a damper control 753 or door stop 754 (or both) are activated to block or impede door 50 closure. The door remains open until the obstruction is clear, as determined by the sensor network 741, or another condition causes the door to close, for example, a watchdog timer in the control 740 expires (a timeout condition), or a signal is received through the communications interface 758 or remote control/key sensor 747. A feedback system 755 may be provided with audible 757 and/or visible 756 indicators, to indicate the status of the system. For example, low battery, failure (mechanical or electronic), object sensed, timeout, and/or door restraint active.

Figure 8:
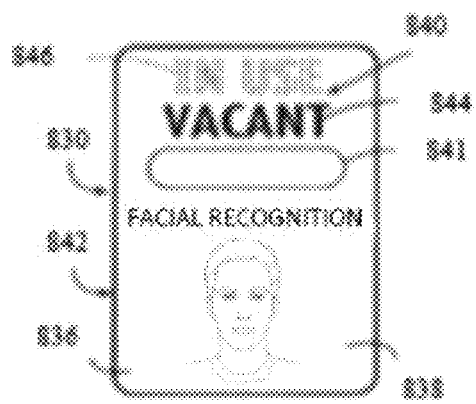
FIGS. 8A and 8B are diagrammatic illustrations of one actuator and its faceplate in ready and locked states, respectively, for use in an outside a room, the faceplate including an iconic display and multicolor illumination.
FIGS. 8C and 8D are diagrammatic illustrations for an actuator and its faceplate in ready and locked states, respectively, for use in an inside area, the faceplate including an iconic display and multicolor illumination.
FIGS. 8E and 8F are diagrammatic views of one actuator and its faceplate in ready and locked states, respectively, for general use.
Figure 8:
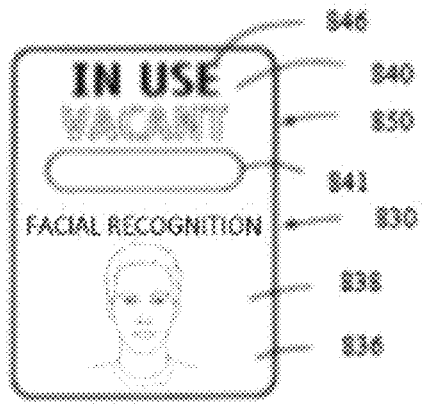
Figure 8:
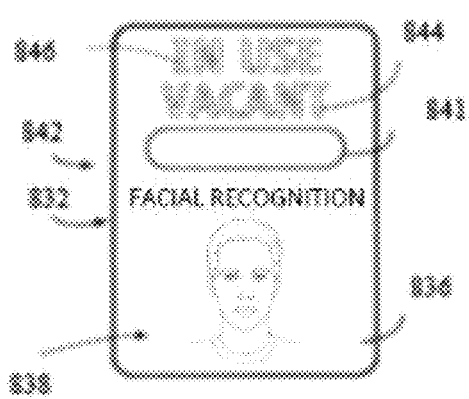
Figure 8:
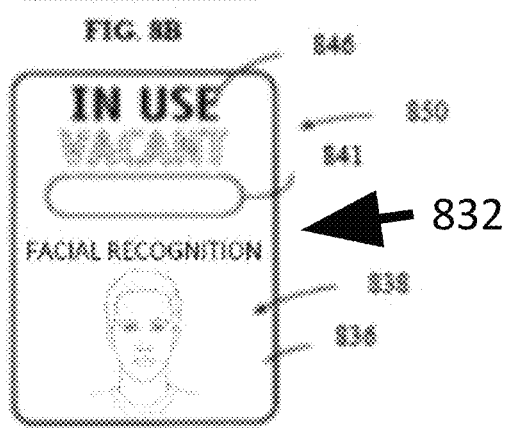
Figure 8:
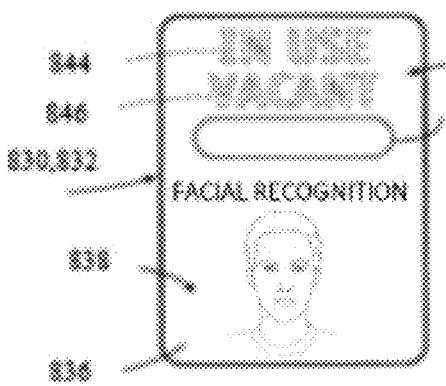
Figure 8:
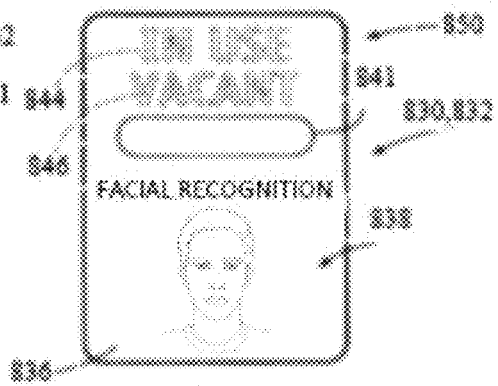

With reference to FIG. 8A, while the interface 830, 832 are generally similar, they will be operated based on need. By way of example, when the authentication device 150 is in a ready state 842, the first interface 830 will display a "vacant" message 844 indicating to the patron indicated by display portion 841 that the area behind the door is available for use. An "in use" message 846 will not be displayed and hidden from view. The iconic display 838 will intermittently flash in one color, such as a green color, for viewing by the patron indicated in display portion 841. The vacant message 844 may be displayed in the green color as well. As illustrated now with reference to FIG. 8B, when the authentication device 150 is placed in a locked door state, the in-use message 846 is now displayed and the green vacant message 844 is hidden from view. In the locked door state, the iconic display 838 will be shown as a steady state, solid red color.

As illustrated with reference to FIG. 8C, the second interface 832 located in the area behind the door, the vacant message 844, the in-use message 846, and the iconic display 838 will be hidden from view when the authentication device 150 is in the ready state 842. As illustrated with reference to FIG. 8D, in the locked door state, the second interface 832 will display the in-use message 846 in the red color and the iconic display 838 as a flashing green color.

Yet further, and with reference to FIGS. 8E and 8F, other options will come to the mind of those skilled in the art regarding use of the interface and information carried by the interface 830 now having the benefit of the teachings of the present technology. By way of further example, consider the area behind the door to be a single use room wherein the two touch-free interfaces 830, 832 are used in conjunction with an electronic strike plate of a latching mechanism, and a presence sensor monitoring the area behind the door (herein a passive infrared (PIR) sensor used by way of example). When a patron approaches the door 52, the first interface 830 will be illuminated with the green flashing iconic display 838 (flashing LED lights may be used) indicating that the room is vacant or available. The patron then waves his hand in front of the interface 830 thus sending a signal to the controller to disengage the electric strike of the latching mechanism and open the door 52. Upon entering the room, the door 52 is closed and the first interface 830 illuminates to indicate an occupied room, as earlier described with reference to FIG. 8B. The first interface 830 at the outside area would now be "inoperable" by any patron as earlier described with reference to FIG. 8B and the door 52 locked. By way of example, if another patron tries to activate the first actuator 830 while in the "in use" state, an audible tone may optionally be heard to acknowledge the activation attempt, but the door will not open. The presence sensor monitors the inside area to ensure a person, in this case the patron, now identified as a patron is inside the room. If for some reason the patron did not enter the room, authentication device 150 will be reset after a specified time and the first actuator 830 will become active again.

With the patron inside the room, and as earlier described with reference to FIG. 8C, the second actuator 832 will have red illuminating the in-use message 846, an occupied window, and green flashing indicia 838 to indicate the door 52 is ready to be opened from the inside area. Once the patron activates the second interface 832, a signal is sent to the controller 102 to disengage the electric strike of the latching mechanism and the room door 52 is opened. When the door 52 closes, the authentication device 150 is reset and ready to be opened from the outside again. The door 52 may be manually opened from the outside by manually unlocking the door handle via a key to bypass the electric strike. If the patron were to manually open the door 52 from the inside area and exit the room, the sensor recognizes that the inside area is empty and the authentication device 150 will be reset to the ready state 842. One process employing the authentication device 150 is described as the third mode of operation 840. The process for automatically operating a door 52 by the patron desiring to enter the inside area from the outside area uses door driving device 200 to open and close the door, and locks the door using the door knob and bolt 56, 56A, both communicating with the controller 120, wherein the controller 120 communicates with the first interface 830 positioned within the outside area and the second interface 832 positioned within the inside area.

The controller 120 is responsive to signals received by the first and second interfaces 830, 832 initiated by affirmative actions by the patron. One embodiment of the process includes: (a) setting the authentication device 150 to the ready state 842; (b) providing an occupancy status of the inside area to the patron approaching the first actuator 830 in the outside area; (c) directing the patron to request that the door 52 be opened in response to an unoccupied status for the inside area; (d) providing an actuating signal by the patron to the first interface 830 when the patron typically waving his hand as illustrated would like to open the door 52; (e) transmitting a door opening signal from the first interface 830 to the controller 120; (f) opening the door 52 using door driving device 200 in response to the door opening signal from the controller 120, if there is obstruction toward opening the door, the opening will pause until the obstruction is removed the controller further functions to; (g) sense a presence of the patron within the area behind the door using the presence sensor while the movement of the patron is herein monitored, the patron may indeed be another patron already using the area; (h) automatically closing the door 52 in response to a door closing signal from the controller; (i) locking the door 52 in response to a latching signal from the controller; (j) setting the first display 830 to an in use status, the locked door state, above described; (k) indicating the in use status for the area behind the door at the first display 830; and (l) indicating a door ready for opening status at the second display 832, as above described with reference to FIG. 8D.

The process may further include: (m) providing an actuating signal to the second display 832 by the patron desiring to open the door 52 and exit the area behind the door 52; (n) unlocking the door 52 in response to an unlatching signal from the controller after the patron indicated the wish to leave the area (o) transmitting a door opening signal from the second display 832 to the controller (as above described, the patron may manually open the door) (p) opening the door 52 using the door driving device 200 in response to the door opening signal from the controller 120; (q) sensing an absence of the patron within the area behind the door 52 using the presence sensor; (r) automatically closing the door 52 in response to a door 52 closing signal from the controller 120; and (s) setting the first display 830 to the ready state 842. In keeping with the teachings of the present technology, a conventional door closer may include a pre-existing door closer or a door closing apparatus integrated into the device.

Figure 9:
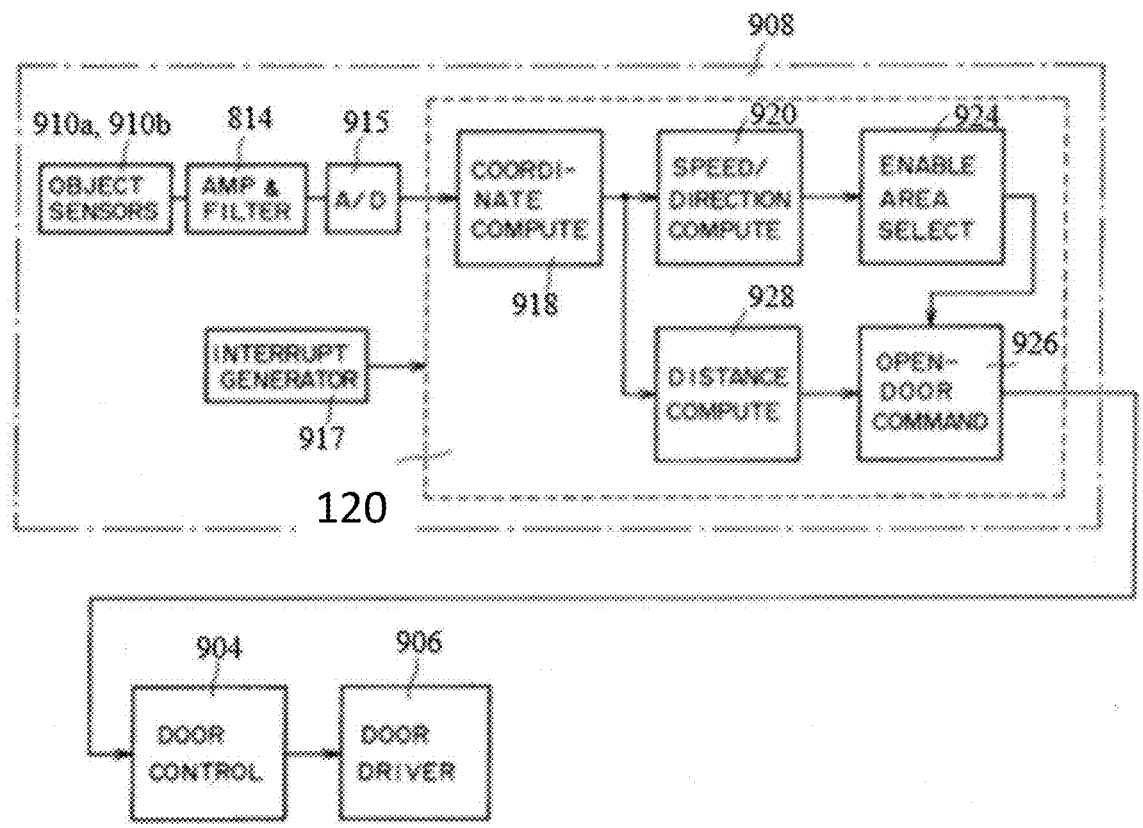
FIG. 9 is a block diagram of the automatic door opening and closing system shown.

FIG. 9 is a block diagram of the automatic door opening and closing system 100 as shown. The door 52 is opened and closed by door driving device 200 in response to a control signal supplied from a control authentication device 150 as shown in FIG. 9. The door opening and closing control authentication device 150 responds to an open-door command signal generated by a detecting device 908 when a time for opening the door 52 lapses, and provides a control signal to the door driving device 200 so as to drive the door open in opposite directions at a predetermined speed. The door opening and closing control authentication device 150 is arranged to provide the door driving device 200 with a control signal to close the door 52 when a predetermined time period lapses after it receives the open-door command signal. The detecting device 908 includes object sensors 910a and 910b, such as ultrasonic sensors, disposed of on opposite sides of the door 52. The object sensors 910a and 910b can sense an object moving in a semi-circular monitoring area defined by an outer edge and the door 52, and produces detection signals representing the distances of the object from the respective sensors 910a and 910b. The detection signals from the sensors 910a and 910b are applied to an amplifier-filter unit 914 (FIG. 9) where they are amplified, and undesirable noise components are filtered out. Outputs of the unit 914 are converted into digital signals in analog-to-digital (A/D) converters 915 before they are applied to a processor 120.

Figure 10:
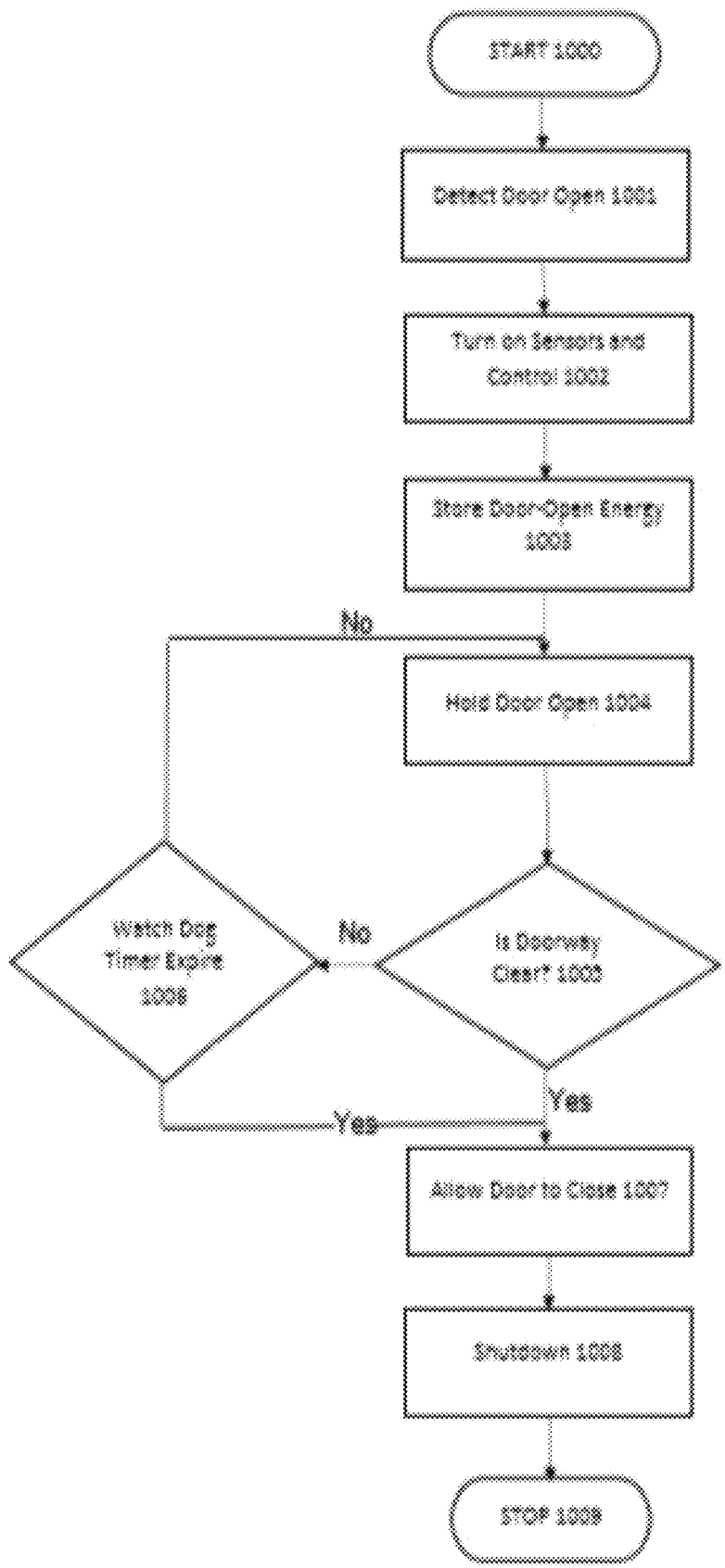
FIG. 10 shows a flow chart of the control system operation according to the present technology.

FIG. 10 shows a flow chart of door driving device 200 operation. Initially, at start 1000, the device is typically powered down. An opening of the door 52 is detected 1001, and the first sensor(s) 130 and control are turned on 1002. As the door 52 is opened, energy is stored 1003. After the door 52 is opened, it is held open 1004. The control then uses the sensor network to determine whether the doorway is clear 1005. If it is clear, the door is allowed to close 1007, the system shuts down 1008, and the process stops 1009. If the sensor network does not indicate that the doorway is clear, a watchdog timer is referenced 1006, to determine whether a maximum door retention time is exceeded. If it is exceeded, the door 52 is allowed to close 1007, preferably with an audible or visual advance warning. If the maximum door retention time is not exceeded, the door 52 is held open 1004, and the sensing process is repeated to determine whether the doorway is clear 1005. The sensor network may be operative, for example, once per second, to save energy. The maximum door retention time can be preset by the user's requirement.

Figure 11:
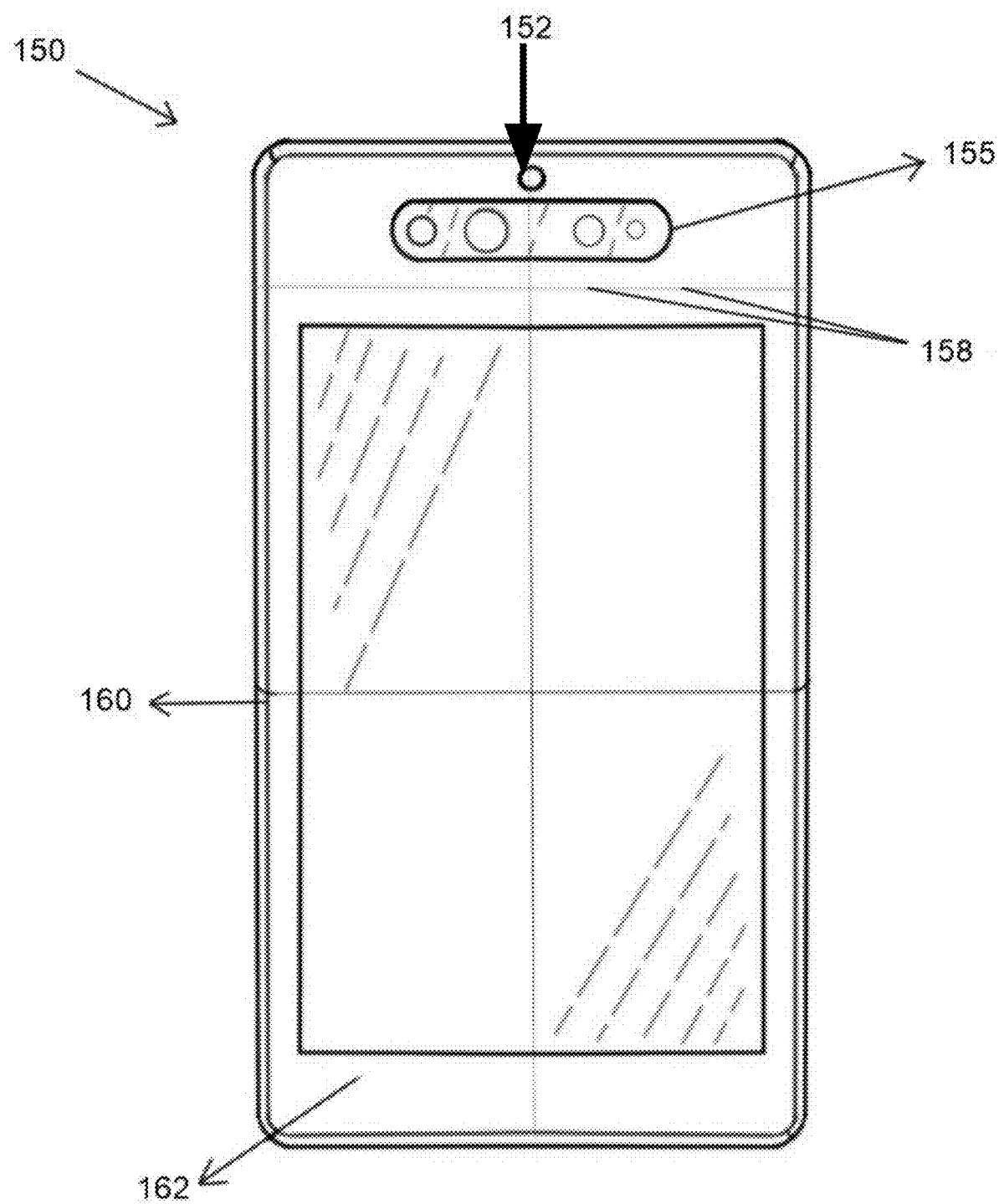
FIG. 11 show a diagram of an authentication device 150.

FIG. 11 is a diagram of an authentication device 150. The device 150 comprises the camera 152, a spoof detection means 155, a user face tracking auto tilt means 158, a touch screen 160 and a speaker 162. In one embodiment, the device 150 depending on the context, the face of a user might appear alone or in a crowd and may show the face in profile or looking straight ahead. In another embodiment, the device 150 comprises facial recognition software that analyzes images of people's faces based on factors such as distance between your eyes and the distance from forehead to chin. The software creates a facial signature based on facial landmarks that distinguish one face from another. In another embodiment, the facial signature (which is really just a mathematical algorithm) is compared to a database of known faces. This is what is known as 1: n matching (where n equals the number of face signatures in a database). In yet another embodiment, a match or no match determination is made based on whether the faceprint captured matches that of an image in a facial recognition system database.

The auto tilt means 158 captures multiple face images and checks for changes and natural motion. A 2D or 3D or similar face moves differently from a 2D photo, and the spoof detection means 155 detect this difference. The detection means 155 includes a mechanism that makes sure the submitted recordings were indeed taken from a live person in front of the camera 152. Further, the detected video replays and other copies like a special texture-based algorithm that knows when a recaptured version of a person is presented instead of a real person. Artificial Intelligence (AI) is leveraged through powerful DCNNs (deep convolutional neural networks) or similar like methods and enable the detection of presentation attacks like 3D masks, videos, etc. Optionally, the user is guided to turn their head a certain way and verify that the head was turned in the specified direction (challenge-response). The auto tilt means 158 is mainly based on human detection and identification analysis. It involves face detection or contour detection that identifies whether the detected object is a person, while it also includes trajectory tracking and statistical analysis for identification estimation. It is known that face detection with reasonable detection rates has been well developed in the literature and has the closest relevance to human characteristics, thus is good for people identification. In short, once a person is detected in the region of interest (ROI), the trajectory of his face can be tracked and then analyzed by a statistical analyzer to calculate the corresponding cumulative probability, and will be used as the estimation of the identity.

Many modifications and other embodiments of the technology will come to the mind of one skilled in the art having the benefit of the teachings presented in the foregoing descriptions and the associated drawings and photos. Therefore, it is to be understood that the technology is not to be limited to the specific embodiments disclosed, and that modifications and alternative embodiments are intended to be included within the scope of the claims supported by this specification. Some of the advantages of the present technology are as enlisted. In one aspect of the present technology, the technique enables intent prediction for predicting user's door entry intent based on trajectory AI and supplemental voice recognition Natural Language Processing (NLP).

The present technology helps customers create safer communities, great customer experiences and personalized service through face recognition and AI. Using the present technology's identity authentication platform, retailers, banks, transportation centers and other great organizations can instantly confirm identity, offer secure transactions and provide seamless experiences. The face recognition application program interface (API) and software development kit (SDK) allows for easy integration with a variety of third-party systems.

Moreover, the present technology further integrated with authentication means enabling users to access the door automatically. Firstly, one advantage is a simple connection between the door driving device and computer or tablet or mobile or the like device via a wireless transmission and quicker data exchange. Secondly, the intuitive operation makes complicated manuals redundant. Thirdly, all settings can be easily saved and used for the door driving device. Thus, customer specific profiles can be saved, administered and sent electronically. Further, comfortable documentation of commissioning, service and diagnostic protocols as well as all required statistics. Moreover, a password is used to protect against unauthorized changes of operating parameters and servicing data. In one aspect, the present technology may be used for Government identification verification for validating the authenticity of government-issued documents such as passports or government ID in person or online. In another aspect, the present technology may be an alternative for password replacement using face recognition as a primary or secondary means of authentication to ensure apps and devices are only accessed by authorized individuals. In another aspect, the present technology instantly validates customer and provider identities for ride service, delivery and other sharing applications.

"Computer readable media" can be any available media that can be accessed by client/server devices. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by client/server devices. Communication media typically embodies computer readable instructions, data structures, program modules or other data in a modulated data signal such as a carrier wave or other transport mechanism and includes any information delivery media.

All references including patent applications and publications cited herein are incorporated herein by reference in their entirety and for all purposes to the same extent as if each individual publication or patent or patent application was specifically and individually indicated to be incorporated by reference in its entirety for all purposes. Many modifications and variations of this technology can be made without departing from its spirit and scope, as will be apparent to those skilled in the art. The specific embodiments described herein are offered by way of example only. The above specification, examples and data provide a complete description of the manufacture and use of the composition of the technology. Since many embodiments of the technology can be made without departing from the spirit and scope of the technology, the technology resides in the claims hereinafter appended.

While this technology has been particularly shown and described with references to preferred embodiments thereof, it will be understood by those skilled in the art that various changes in form and details may be made therein without departing from the spirit and scope of the technology as defined by the appended claims.

What is claimed is:

1. A touch free door opening apparatus for mounting on a door, comprising:
    a door driving device configured to be attached to the door with constant contact with the floor surface, comprising:
        a door retaining mechanism for automatically attaching the door driving device to the door;
        a door release mechanism for automatically detaching the door driving device from the door;
        at least two sensors, wherein a first sensor for detecting the presence of a person in or near the door, and a second sensor;
        a controller configured to control the door driving device for opening and closing the door;
        a wireless communication means for connecting the door driving device with an authentication device or access control system;
    an authentication device in communication with the controller configured to determine opening of the door, when a user is authenticated;
    a voice recognition module, wherein said voice recognition module captures audio data through a microphone and transfers data to the controller; and
    an image-capturing module, wherein the module intelligently predicts the user intent for entry or exiting the door using second sensor data.

2. The touch free door opening apparatus of claim 1, comprising a powertrain that includes an electric DC motor, a suspension system, and at least one wheel.

3. The touch free door opening apparatus of claim 1, wherein the door retaining mechanism comprises of two electric DC motors controlled by the controller for enabling vertical and horizontal motion respectively.

4. The touch free door opening apparatus of claim 3, wherein the door driving device includes a third sensor for sensing electrical current spike from the DC motors to intelligently sense the door to floor distance and thickness.

5. The touch free door opening apparatus of claim 1, wherein the controller communicates with a computing device to open and close the door and perform a series of operations for opening and closing the door driving device.

6. The touch free door opening apparatus of claim 1, wherein, the door driving device includes a fourth sensor that determines the distance between the object and the door driving device.

7. The touch free door opening apparatus of claim 1, wherein door driving device includes a power supply and a power inlet which is configured to receive inlet power.

8. The touch free door opening apparatus of claim 1, wherein a touch screen arranged on the door apparatus, displays a message on the screen and informs the user about the status of the door driving device and allows interaction with the door driving device.

9. The touch free door opening apparatus of claim 1, comprising:
    a roller wheel actuator mechanism having a first wheel and a first motor attached to the first wheel for rotating the first roller wheel;
    a vertical actuator comprising a second motor, for positioning the roller wheel actuator mechanism against and away from a surface located by and an edge of the door; and an image capturing unit for identifying and verifying at least one human face by comparing and analyzing a plurality of captured frames based on the at least one human face feature, coupled to the door frame.

10. A touch free door opening apparatus for mounting on an edge of a door, comprising: a door driving device configured to be attached to the edge of the door comprising:
- a door retaining mechanism for automatically attaching the door driving device to the door;
- a door release mechanism for automatically detaching the door driving device from the door;
- a roller wheel actuator mechanism having a first wheel and a first motor attached to the first wheel for rotating the first roller wheel;
- a vertical actuator comprising a second motor, for positioning the roller wheel actuator mechanism against and away from a surface located by the edge of the door;
- at least a first sensor and an image capturing unit; and
- a controller configured to control the door driving device for opening and closing the door; and
- an authentication device in communication with the image capturing unit for identifying and verifying at least one human face by comparing and analyzing a plurality of captured frames based on at least one human face feature;
- wherein the first sensor is configured to detect the presence of a person or object in or near the door; and
- an indicating device for providing an indication that the device is operative.

* * * * *